United States Patent Office 3,337,569
Patented Aug. 22, 1967

3,337,569
METHOD OF PRODUCING O-NICOTINOYL-CHOLINE CHLORIDE
Eduard Imhoff, Eichstr. 28, Neuenhof,
Aargau, Switzerland
No Drawing. Filed June 24, 1965, Ser. No. 466,833
Claims priority, application Switzerland, June 24, 1964,
8,243/64
4 Claims. (Cl. 260—295.5)

The present invention relates to a composition of matter, a method of making the same and also to a method of treating patients with the composition.

More particularly, the present invention is concerned with O-nicotinoylcholine chloride and the hydrochloride thereof, as well as methods of making and using the same.

It is thus an object of the present invention to provide a compound having a vasodilating effect, which compound is easily water soluble and therefore suitable for administration by injection in the form of an aqueous solution.

It is a further object of the present invention to provide a method of producing such compound.

It is yet another object of the present invention to provide a method of treating patients with such compound.

With the above and other objects in view, the present invention contemplates a method of producing an O-nicotinoylcholine halide, comprising the step of reacting a beta-halogen-ethylester of nicotinic acid with trimethylamine.

The present invention also comprises reacting a methyl halide with nicotinic acid-N,N-dimethylaminoethyl ester; and with the method of reacting a source of nicotinoyl radical with a choline halide.

It is also within the scope of the present invention to provide an O-nicotinoylcholine halide and particularly O-nicotinoylcholine chloride and the hydrochloride thereof.

In addition, the present invention proposes a method of treating a patient requiring nicotinic acid or choline therapy, which comprises the step of administrating to the patient O-nicotinoylcholine chloride or the hydrochloride thereof.

O - nicotinoylcholine chloride and the hydrochloride thereof are esters of the beta-pyridine carboxylic acid of the following formula:

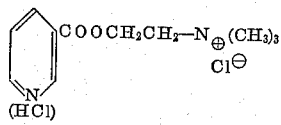

The vasodilating effect of the free beta pyridine carboxylic acid is only of short duration. It is possible to prolong the effect by esterification of the free acid, however, generally the esterified products are of lesser water solubility and this is a considerable disadvantage when it is intended to administer to a patient a solution of such esterified product by injection.

It has been found, however, that O-nicotinoylcholine chloride and its hydrochloride are easily water soluble.

The method of the present invention for producing O-nicotinoylcholine chloride or the hydrochloride thereof is carried out by reacting nicotinic acid esters or functional equivalents thereof with trimethylamine or methyl halides; or by reacting nicotinic acid or other sources of nicotinoyl radical with choline chloride, in the presence of dehydrating agents if the reaction will result in the formation of water, and in the presence of suitable solvents for the starting materials.

Thus, an acylating agent which is a functional derivative of nicotinic acid and suitable for esterification may be reacted wth choline chloride. Such acylating agents include the nicotinic acid itself, the nicotinic acid anhydride and particularly the nicotinic acid halides including their hydrohalic salts. It is advantageous to use as solvent a tertiary base, for instance pyridine, or dimethyl formamide, while as dehydrating agent, when required, preferably phosphorus oxychloride will be used.

Suitable nicotinic acid esters include, on the one hand, the nicotinic acid-beta-halogenethyl esters and, on the other hand, nicotinic acid-N,N-dimethylaminoethyl ester.

The following examples are given as illustrative only, without, however, limiting the invention to the specific details of the examples.

*Example 1*

To convert nicotinic acid-beta-halogenethyl esters to O-nicotinoylcholine halide, the nicotinic acid-beta-halogenethyl esters are reacted with trimethylamine. The most satisfactory reaction is obtained by attaching trimethylamine to nicotinic acid-beta-iodoethyl ester. The latter can be obtained in good yield from nicotinic acid-beta-chloroethyl ester by reaction with sodium iodide dissolved in acetone and methylethylketone.

Four grams (14 millimols) nicotinic acid-beta-iodoethylester dissolved in ten milliliters of absolute acetone are reacted with an excess (51 millimols) of trimethylamine. After about 30 minutes, O-nicotinoylcholine iodide starts to precipitate, after filtration and purification by being recrystallized twice from ethanol it will be found that the O-nicotinoylcholine iodide has a melting point of 199–200° C.

One gram (3 millimols) O-nicotinoylcholine iodide are dissolved in 20 milliliters of a mixture of equal parts of water and methanol, and 2.2 grams (15 millimols) freshly precipitated and washed silver chloride are thereto added. The mixture is then shaken at room temperature for several days. Thereafter, the precipitated silver iodide is removed by filtration and the residual solution is evaporated. After twice recrystallizing the evaporation residue with ethanol-ether, O-nicotinoylcholine chloride is obtained having a melting point of 205–206° C.

*Example 2*

Nicotinic acid-N,N-dimethylaminoethyl ester may be directly reacted with methyl chloride or methyl bromide to form O-nicotinoylcholine chloride or bromide. However, it has been found more advantageous to carry out the reaction with methyl iodide to obtain in a susbtantially quantitative yield the O-nicotinoylcholine iodide and then to convert the latter, for instance, to the corresponding chloride.

An equivalent amount of methyl iodide is carefully added to a solution of nicotinic acid-N,N-dimethyl ester in ethyl ether. After a short period of time O-nicotinoylcholine iodide starts to crystallize and completion of the reaction takes about 2 hours. After separating the thus formed crystals from the liquid by filtration and three times recrystallizing from ethanol, O-nicotinoylcholine iodide melting at between 199 and 200° C. is obtained in an average yield of 96%.

The further reaction of the O-nicotinoylcholine iodide to O-nicotinoylcholine chloride is carried out as described in Example 1.

*Example 3*

Equivalent amounts of nicotinic acid chloride hydrochloride, choline chloride and pyridine are heated under intensive stirring to up to 110° C. until the reaction product melts as a homogeneous mass.

After cooling, the reaction product is treated with absolute ethanol in which the hydrochloride of O-nicotinoylcholine chloride is insoluble. The thus purified residue is then recrystallized from dilute ethanol, if desired with an addition of activated carbon for decolorization of the product. The thus obtained O-nicotinoylcholine chloride hydrochloride has a melting point of 213–214° C. The yield is 38%.

*Example 4*

Equivalent amounts of nicotinic acid chloride hydrochloride and choline chloride dissolved in dimethyl-formamide are heated for at least 30 minutes under intensive stirring to a temperature of about 70° C. After cooling, the hydrochloride of the new compound will precipitate in crystalline form so that generally further purification, such as described in Example 3 will not be required. The yield of O-nicotinoylcholine chloride hydrochloride equals 96%.

O-nicotinoylcholine chloride can be produecd in a simple conventional manner from the chlorohydrate of this ester which is obtained according to Examples 3 and 4, for this the following example is given: 55.2 grams (0.196 mol) O-nicotinoylcholine chloride hydrochloride are dissolved in 500 milliliters distilled water and a solution of 10.38 grams (0.098 mol) pure sodiumcarbonate dissolved in 115 milliliters of water are added dropwise during 10 minutes. The pH of the solution has to be watched carefully. It is not allowed to increase over 5.9. After 30 minutes the water is evaporated in vacuo. To the resulting crystalline residue are added 200 milliliters of absolute ethanol and the resulting solution is filtered through Celite for to free the solution from undissolved sodium chloride. To the alcoholic solution are then added 20 milliliters of absolute ether. The precipitated crystals melting at 200° C. are filtered off and dried in vacuo during 24 hours. The yield amounts to 46.8 grams what corresponds to 98% of the theory.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing O-nicotinoylcholine chloride, comprising the steps of reacting in a solvent therefor beta-iodo-ethylester of nicotinic acid with trimethylamine so as to precipitate solid O-nicotinoylcholine iodide; separating the thus formed O-nicotinoylcholine iodide from the reaction mixture; and reacting said O-nicotinoylcholine iodide in a solvent therefor with silver chloride thereby converting said O-nicotinoylcholine iodide into O-nicotinoylcholine chloride.

2. A method of producing an O-nicotinoylcholine halide, comprising the step of reacting a methyl halide with nicotinic acid-N,N-dimethylaminoethyl ester.

3. A method of producing O-nicotinoylcholine chloride, comprising the steps of reacting an ethyl ether solution of nicotinic acid-N,N-dimethylamino ethyl ester with methyl iodide so as to form crystals of O-nicotinoylcholine iodide; separating the thus formed crystals; dissolving said crystals in a water-methanol mixture; and reacting the thus dissolved O-nicotinoylcholine iodide with silver chloride so as to convert said O-nicotinoylcholine iodide into O-nicotinoylcholine choride.

4. A method of producing O-nicotinoylcholine chloride, comprising the steps of reacting an ethyl ether solution of nicotinic acid-N,N-dimethylamino ethyl ester with methyl iodide so as to form crystals of O-nicotinoylcholine iodide; separating the thus formed crystals; dissolving said crystals in a water-methanol mixture; shaking the thus dissolved O-nicotinoylcholine iodide for a prolonged period of time with freshly precipitated silver chloride so as to convert said O-nicotinoylcholine iodide into O-nicotinoylcholine chloride, the latter remaining in solution under simultaneous precipitation of silver iodide; separating the thus formed solution of O-nicotinoylcholine chloride; and recovering O-nicotinoylcholine chloride therefrom.

References Cited

UNITED STATES PATENTS 2,094,608   10/1937   Kritchevsky _____ 260—501 X

FOREIGN PATENTS 159,961   6/1951   Australia.

OTHER REFERENCES

Krulich et al.: Chem. Abstracts, vol. 50, par. 1204–5 (1961).

Mndzhoyan: Chem. Abstracts, vol. 41, par. 2737 (1947).

WALTER A. MODANCE, *Primary Examiner.*

JULIAN S. LEVITT, *Examiner.*

A. L. ROTMAN, S. FRIEDMAN, *Assistant Examiners.*